Patented Oct. 11, 1932

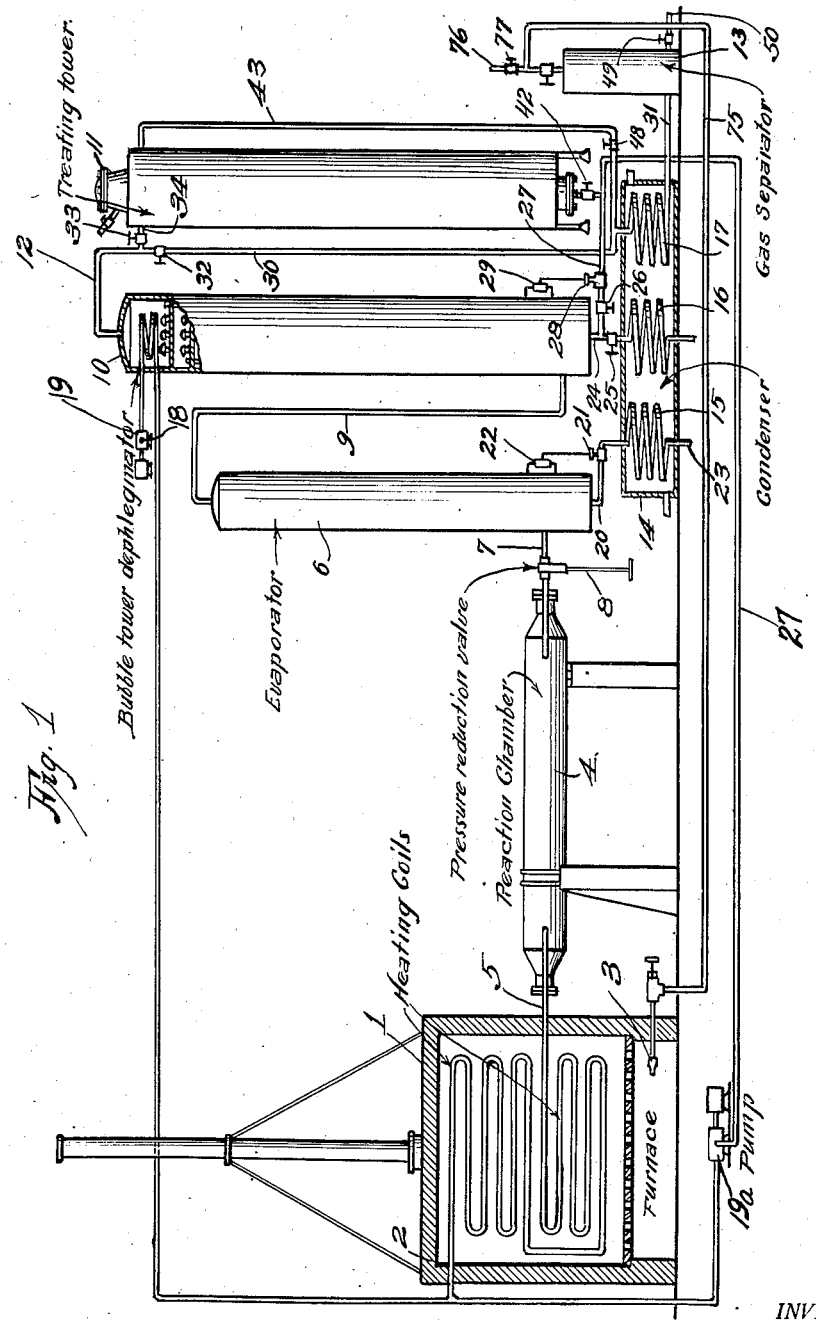

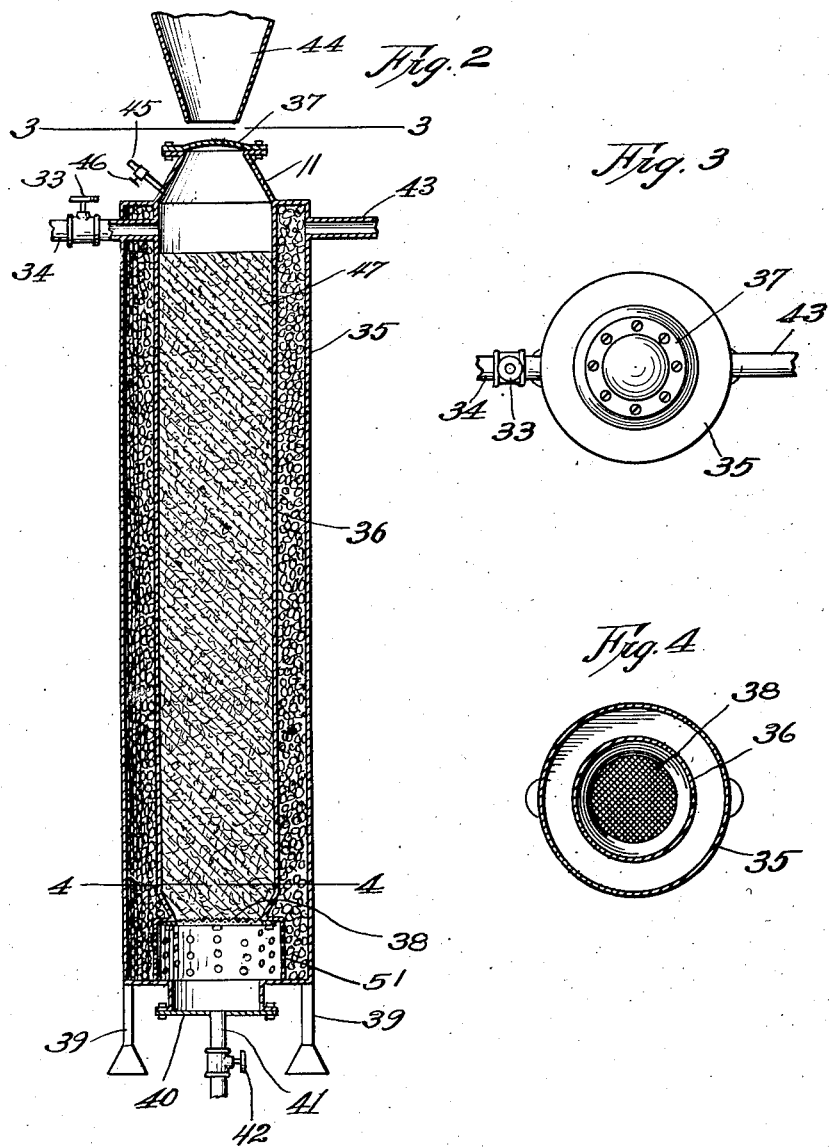

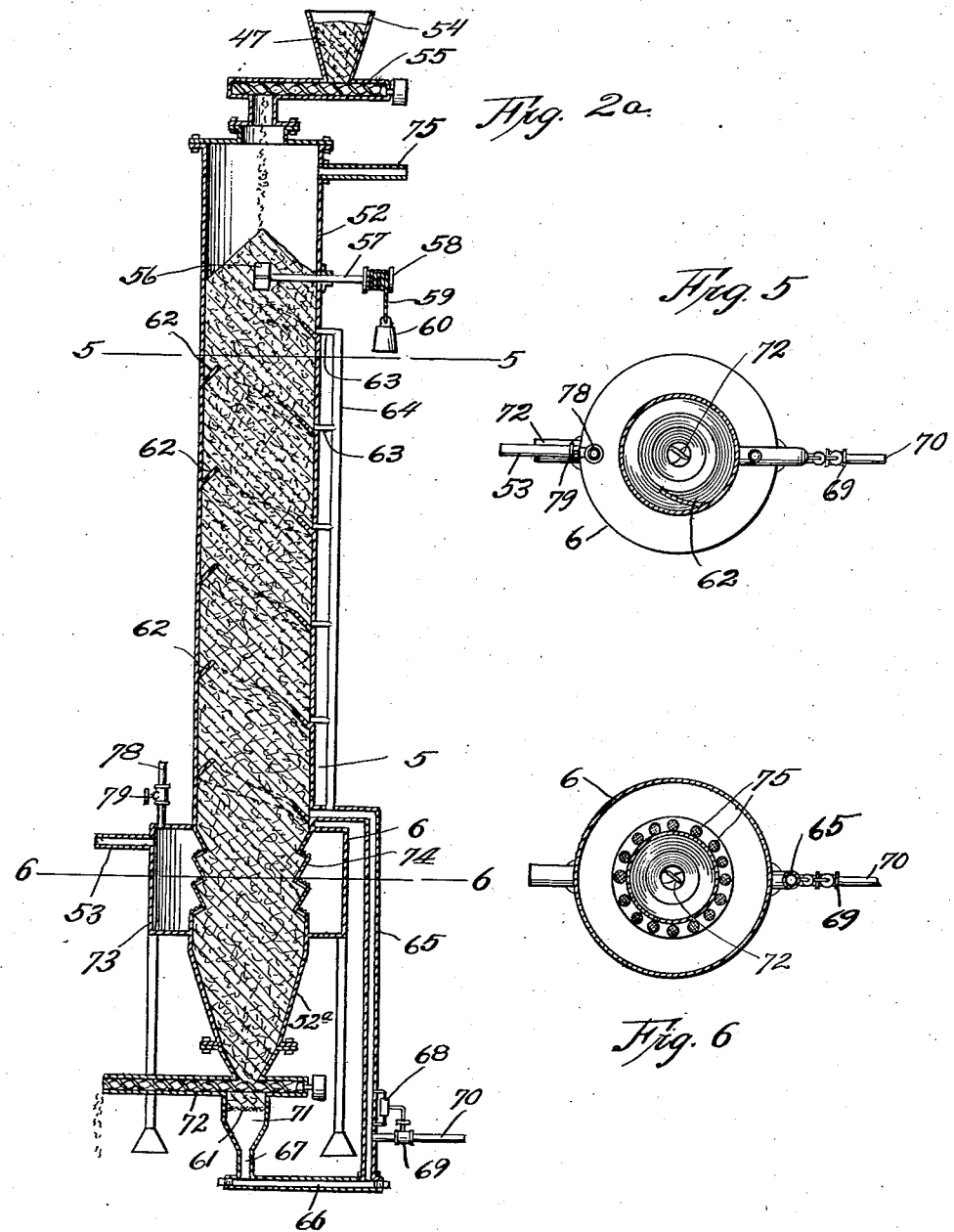

1,882,000

UNITED STATES PATENT OFFICE

ROY CROSS, OF KANSAS CITY, MISSOURI, ASSIGNOR TO CROSS DEVELOPMENT CORPORATION, OF WILMINGTON, DELAWARE, A CORPORATION OF DELAWARE

PROCESS FOR TREATING OILS

Application filed April 1, 1925. Serial No. 19,856.

This invention relates to improvements in a process and apparatus for treating oils, and is primarily adapted to the treatment of petroleum hydrocarbons resulting as vapors from a cracking system.

Among the salient objects of the invention are, to provide a process in which the cracked vapors or those distilled from a cracked product or crude equivalent which has been subjected to high temperatures and pressures, are passed directly to a treating tower wherein they are intimately contacted with the treating substance; to provide a process in which the treating stage may be either operated as a batch or as a continuous operation, the condensate finally recovered constituting a marketable purified commercial gasoline eliminating the necessity of subsequent treating or redistillation; to provide a process in which advantage is taken of the contained heat of the cracked products to effect distillation with the reduction of pressure, the vapors so evolved, together with the gases present, being simultaneously treated in a subsequent treating stage or tower; to provide a process in which the treating is done by means of a highly adsorptive agent such as a hydrous aluminum silicate including fuller's earth, bentonite or zeolites of somewhat similar character or other native clays, also manufactured substances such as silica gel, which have adsorptive qualities; to provide a process whose novelty lies primarily in the treatment of cracked oil products comprising both the condensable and incondensable material, and a process in which the gas present is purified by contact with an iron oxide mixed with the adsorptive material to remove the hydrogen sulphide while the condensable or distillable products are purified, decolorized, deodorized and sweetened by the adsorptive material with which is intimately mixed a metallic substance having an affinity for the sulphur compounds in the oil.

Fig. 1 is a side elevational view of the apparatus with parts in section.

Fig. 2 is a sectional view of the treating tower for batch treatment of the vapors.

Fig. 2ª is a modified form of construction in which the treating is done continuously.

Fig. 3 is a view taken along the lines 3—3 in Fig. 2.

Fig. 4 is a view taken along the line 4—4 in Fig. 2.

Fig. 5 is a view taken along the line 5—5 in Fig. 2ª.

Fig. 6 is a view taken along the line 6—6 in Fig. 2ª.

Referring to the drawings, at 1 are shown heating coils mounted in a furnace 2 preferably heated by means of gas burners such as those shown at 3. Four (4) is a reaction chamber heavily insulated to prevent loss of heat through radiation and of forged steel construction from a single ingot of metal. The chamber is substantially forty (40') feet in length and from four (4') to six (6') feet in diameter. It is connected to the heating coils by means of a transfer line 5. At 6 is shown an evaporator connected to the reaction chamber by means of a transfer line 7 in which is interposed a pressure reduction valve 8. A vapor line 9 communicates from the top of the evaporator to the bottom of the bubble tower dephlegmator designated as 10. At 11 is shown a treating tower connected to the bubble tower by a vapor line 12. In Fig. 1 is shown the tower used for batch treatment such as the treating tower shown in detail in Fig. 2. It is understood, however, that this tower may be replaced by that shown in Fig. 2ª as a modified form of operation. At 13 is shown a gas separator, and at 14 a condenser or cooling box in which are positioned the cooling coils 15, 16 and 17, the functioning of which is described in more detail hereafter.

Referring now to the operation of the system, which is primarily a high pressure cracking system in which the oil is charged from any convenient source through the line 18 and is forced by means of a pump 19 to the heating coils 1 where it is brought to a cracking temperature. The velocity of the oil travels through the heating stage and in brief the entire method of heating is so controlled that the oil reaches a cracking temperature substantially on its discharge from the heating coil, thus eliminating appreciable deposition or accumulation of free carbon in the coil. From the heating coil the highly heated oil is passed to a reaction chamber in which it is given sufficient time factor while being maintained under high pressure in its passage therethrough to effect the desired amount of conversion or cracking without substantial vaporization. From the reaction chamber the cracked products are removed through the transfer line 7 and discharged into the evaporator 6 at reduced or substantially atmospheric pressure. This reduction of pressure upon the highly heated products produces a rapid evolution of vapors from the hydrocarbons which pass off through the vapor line 9 to the refluxing tower 10. The unvaporized products constituting the higher boiling point fractions ranging from a heavy gas oil to what is commercially known as fuel oil, are drawn off through the line 20 by manipulation of the valve 21 controlled by an automatic liquid level regulator diagrammatically shown at 22. This residual liquid is directed to the cooling coil 14 and thence to the discharge line 23 to storage. The overhead material constituting the vapors released from the oil body are directed through the line 9 to a refluxing tower which is preferably in the form of a bubble tower dephlegmator in which the vapors rise and pass in an opposed direction to the condensates separated out during the refluxing or dephlegmating action. These dephlegmated vapors pass off through the vapor line 12 while the refluxed liquid gravitates to the bottom of the tower where it may be drawn off through the pipe 24 controlled by a valve 25 and cooled in the coil 16 or, by closing the valve 25 and opening the valve 26 in the line 27, a constant level is maintained in the tower by manipulation of the valve 28 by the liquid level regulating device 29. The condensate taken off through the line 27 is returned to the suction side of the pump 19ª and is recharged to the system.

The dephlegmated vapors passing off from the top of the bubble tower may be, at the option of the operator, directed immediately through the line 30 to the condenser coil 17 and the condensed distillate passed through the line 31 to the gas separator 13 or by closing the valve 32 in the line 30 and opening the valve 33 in the pipe 34, the vapors are passed into the treating tower 11 shown in detail in Fig. 2. This tower consists of an outer shell 35 and an inner cylindrical shell 36. This inner cylinder has a removable top plate 37 and a bottom consisting of a screen shown at 38. The tower is supported on standards 39. The outer shell is equipped with a removable bottom plate 40 into which is tapped a withdrawal line 41 controlled by a valve 42. A vapor discharge line 43 is connected into the outer shell near the top of the tower. The treating material, which consists of a highly adsorptive material such as hydrous aluminum silicates, a typical form of which is known commercially as "bentonite", or other similar adsorptive clays, including fuller's earth, silica gel or other organic or inorganic materials capable of deodorizing, decolorizing and desulphurizing the vaporous hydrocarbons, are introduced to the tower from a bin, reservoir or container by means of a funnel shaped hopper 44. The preferred type of material utilized in this tower is an intimate mixture of highly adsorbent clay such as bentonite treated with a metallic substance such as copper or a copper compound and with this copper treated clay is mixed iron oxide either produced commercially or in the form of bog iron. Other materials which may be as well used are hydrated oxide of iron, carbonate of iron or hydrated carbonate of iron obtained either as natural ore such as limonite, siderite, hematite, magnetite, bog iron ore, goethite, turgite, iron rust or corroded metallic iron. These iron compounds have the special capability of removing sulphur from the gas. The activity of such oxidized compounds of iron is increased in the presence of moisture or superheated steam, which may be supplied through the line 45 regulated by a valve 46 in the desired quantity. It is preferable, in the case the iron compounds are utilized separately from the metal treated clay, to have the gas and vapors first pass through the iron material, but this is not essential to obtain the desired results. In the case of metal treated clay, copper has been found to be the best adapted material, as it is more active than the more common metals. There are many natural clays, including fuller's earth and other ferruginous clays which, in many instances, accomplish the desired results of decolorizing and bleaching.

The vapors introduced through the line 34 are directed downward through the bed of material shown at 47. The treated vapors passing through the screen at the bottom of the column of adsorptive substance rise into the outer casing and passes off through the line 43 to the condenser coil 17 and thence to the gas separator 13 through the discharge line 31. A valve 48 is positioned in the line 43. The distillate collected in the gas separator may be withdrawn through the valve 49 positioned in the drawoff line 50. Any condensate separated out in the treating tower drips into the lower part of the shell 35 and is withdrawn through the pipe 41 controlled by a valve 42 which is connected into the return line 27.

It is important to note that it is not only the condensable vapors which are treated in the system, but the entire volatile constituents including both the condensable vapors and incondensable gases. Gas treated by this method is satisfactory for industrial and municipal purposes, even though the petroleum or oil that has been cracked is of a very high sulphur content.

In using a batch tower of the character described, it will be necessary, as the treating material becomes poisoned with impurities, to shut down temporarily to replace the treating material with a new batch of the treated clay, or a second tower of like character may be cut into the system and this tower cut out temporarily in order to be given a new charge. In the event that this batch system is used, it is desirable to have the outer casing 35 surrounding the adsorbent material suitably packed with an inert substance or equipped with a bubble tower arrangement in order to produce the desired fractionation of the vapors after the treatment of the vapors by the purifying substance. From 5 to 50 tons of adsorbent material is necessary to treat 5,000 barrels of gasoline, and 1,000,000 cubic feet of gas. The amount used varies according to the sulphur content of the oil charged to the cracking system,—this sulphur content being considerably higher in the California and Mexican oils that in the mid-continent and Pennsylvania oils.

To pack the outer shell of the tower surrounding the inner cylinder containing the treating substance, it is desirable to have the top of this shell removable in order that the packing material may be introduced into the annular space surrounding the inner cylinder and likewise a perforated removable cylinder 51 is inserted between the bottom of the inner and outer cylinders to avoid mixing of the outside packing and the treating material when the latter is discharged from the tower in cleaning.

A modified form of construction as a treating tower is shown in Figs. 2ª, 5 and 6. This constitutes a tower in which the volatile materials may be treated continuously. In the drawings the tower is designated as 52, and has a vapor inlet pipe 53 which if connected into the system shown in Fig. 1 would communicate with the vapor line 12 in place of the line 34 shown in connection with the batch tower. At the top of the tower is a hopper 54 containing the treating material which will consist of the same material charged to the batch tower. This material, designated as 47 in connection with both towers, is fed by means of a screw conveyor 55 into the top of the tower and builds up to a desired level which is indicated by means of a fan 56 mounted upon a shaft 57 upon which is also mounted a drum 58 and a cable 59 supporting a weight 60. As long as the fan 56 is below the level of the treating material, the weight will remain in a raised position, but with the drop in level below the fan, the weight will drop with its rotation. The treating material is supported in the tower by the conical shaped bottom 52ª and a screen 61 positioned at the bottom or apex of the cone. About the interior surface of the tower is affixed a spiral plate 62 to which the condensates separated in the tower seep and are drawn off through the lines 63 to the vertical header 64 which drains down into a standpipe 65. This standpipe is connected through a line 66 to the draw off line 67 into the bottom of the tower. In this standpipe 65 is connected a liquid level regulating device 68 which controls a valve 69 in the drawoff pipe 70, thus maintaining a liquid level in the reservoir 71 which is just below the screen 61. There is at the bottom of the tower substantially at the apex of the cone 52ª a second screw conveyor 72 driven from any suitable source of power which carries off the spent treating material or that which has been used in the tower for treating the vapors. The vapors are introduced to the tower through a line 53 connected to a hollow drum 73 which surrounds the lower portion of the tower. In that portion of the shell of the tower within this drum are zigzag shoulders designated as 74. The upper face of these shoulders are perforated or have apertures filled with screens as shown at 75 in Fig. 6. In this way the vapors are introduced to the tower without the loss of any of the treating material which is gravitating downwardly through the tower due to the constant withdrawal by means of the screw conveyor 72. The vapors on introduction to the tower rise in an opposed direction to the passage of the treating material and in their passage upward are subjected constantly to the deodorizing, decolorizing, desulphurizing and dephlegmating action of the treating substance. The condensates separated out as explained have a tendency to gravitate toward the shell of the tower due to the rising vapors and pyramiding action and stratification of the treating material. These condensates are collected by the spiral vane 62 and drained back through the line 64 to the standpipe 65. The vapors and gases which are uncondensed, pass off from the top of the tower through a discharge line comparable to the line 43 connected to the batch tower. The condensable vapors are separated as liquid distillate in the condensing coil 17 and are passed thence to the gas separator 13. From the gas separator the liquid is drawn off through the line 50, while the gases may be returned through the pipe 76a to the burners 3 or they may be taken from the system through the line 76 controlled by a valve 77.

Under certain conditions it has been found advantageous to introduce steam with the vapors into the tower and for this purpose a line 78 controlled by a valve 79 is connected into the drum 73. The steam may, under certain conditions, improve the final product. In the case of both the batch and continuous towers the treating material or adsorbent clay may be used repeatedly in many instances from 10 to 100 times if the sulphur is roasted out at relatively low temperatures. Ordinarily, temperatures of from 800° F. to 1100° F. will suffice for this purpose. By this continuous method using a very good grade of adsorbent material such as a metal treated Georgia fuller's earth or adsorbent clay of ninety mesh fineness together with oxidized iron compounds, one barrel of gasoline together with 300 cubic feet of gas, may be treated with as low as two pounds of adsorbent material.

It is essential in connection with the continuous tower that the condensate be removed continuously in order to prevent the tower from becoming vapor bound.

The vapors and gases, treated according to the present method, have been explained as those volatile materials recovered from a high pressure system of cracking, but it is not the purpose of this application to limit the invention to the treatment of such materials, as cracked vapors and gases from any type of conversion or cracking system may be treated as well in towers of this character. Vapors and gases from cracking systems in which the conversion takes place in the vapor phase, or in systems where the conversion is effected partially in the vapor and partially in the liquid phase, are as well adapted to this mode of treatment as where conversion takes place when the oil is substantially in the liquid phase and with a subsequent evolution of vapors with a reduction of pressure.

I claim as my invention:

1. The method of treating petroleum hydrocarbons which comprises cracking the hydrocarbon, vaporizing at least a portion of the cracked product, obtaining therefrom a fraction having a limited boiling range, and passing said fraction in vapor phase continuously in counter flow to a moving stream of a treating agent composed of a basic iron compound and an adsorbent clay intimately mixed with a copper compound.

2. The method of treating petroleum hydrocarbons which comprises cracking the hydrocarbon, vaporizing at least a portion of the cracked product, obtaining therefrom a fraction having a limited boiling range, passing said fraction in vapor phase continuously in counter flow to a moving stream of a treating agent composed of a basic iron compound and an adsorbent clay intimately mixed with a copper compound, and adding steam to the vaporized fraction during treatment.

3. A method of treating gases and vapors resulting from the cracking of petroleum hydrocarbons comprising the steps of contacting the same while in vapor state with a bed of a basic iron compound and an adsorbent clay intimately mixed with a copper compound, withdrawing from said bed liquid formed therein fractionating the vapor by condensing a portion thereof and causing the remaining vapor to contact with the condensate, and separating the gases remaining after condensation of the condensable portions of the treated vapors.

4. A method of treating gases and vapors resulting from the cracking of petroleum hydrocarbons which comprises passing said gases and vapors in contact with and in counterflow to a downwardly moving stream of adsorbent clay, thereby refining the vapors and producing condensate, and drawing off the condensate at various heights of the stream of adsorbent clay.

5. A method of treating gases and vapors resulting from the cracking of petroleum hydrocarbons which comprises passing said gases and vapors in intimate contact with and in counterflow to a downwardly moving stream of treating material composed of a basic iron compound and an adsorbent clay intimately mixed with a copper compound, thereby refining the vapors and producing condensate of a portion of such vapors, and drawing off the condensed vapors at various heights of the stream of treating material.

6. A method of treating gases and vapors resulting from the cracking of petroleum hydrocarbons, which comprises passing said gases and vapors in intimate contact with and in counterflow to a downwardly moving stream of treating material composed of a basic iron compound and an absorbent clay intimately mixed with a copper compound, thereby refining said vapors and causing condensation of a portion of the vapors, adding steam to the gases and vapors during treatment, and drawing off condensed vapors at various heights of the stream of treating material.

7. The method of treating cracked hydrocarbon vapors which comprises contacting the same with iron oxide and an intimate mixture of fuller's earth and copper oxide.

8. The method of treating cracked hydrocarbon vapors which comprises contacting the same with a basic iron compound and an intimate mixture of fuller's earth and copper oxide.

9. A method of treating gases and vapors resulting from the cracking of petroleum hydrocarbons which comprises contacting the same while in vapor phase with a bed of a basic iron compound and an adsorbent clay intimately mixed with a copper compound.

10. A method of treating gases and vapors resulting from the cracking of petroleum hydrocarbons which comprises contacting the same while in vapor state with a bed of a basic iron compound and fuller's earth intimately mixed with copper oxide.

ROY CROSS.

CERTIFICATE OF CORRECTION.

Patent No. 1,882,000.             October 11, 1932.

ROY CROSS.

It is hereby certified that error appears in the printed specification of the above numbered patent requiring correction as follows: Page 4, line 101, cliam 6, for "absorbent" read "adsorbent"; and that the said Letters Patent should be read with this correction therein that the same may conform to the record of the case in the Patent Office.

Signed and sealed this 13th day of December, A. D. 1932.

(Seal)

M. J. Moore,
Acting Commissioner of Patents.